Oct. 12, 1954  B. L. NIKKEL  2,691,340
HAY BALER CAM ACTUATED HAY RETAINING DOGS
Filed April 19, 1950  2 Sheets-Sheet 1
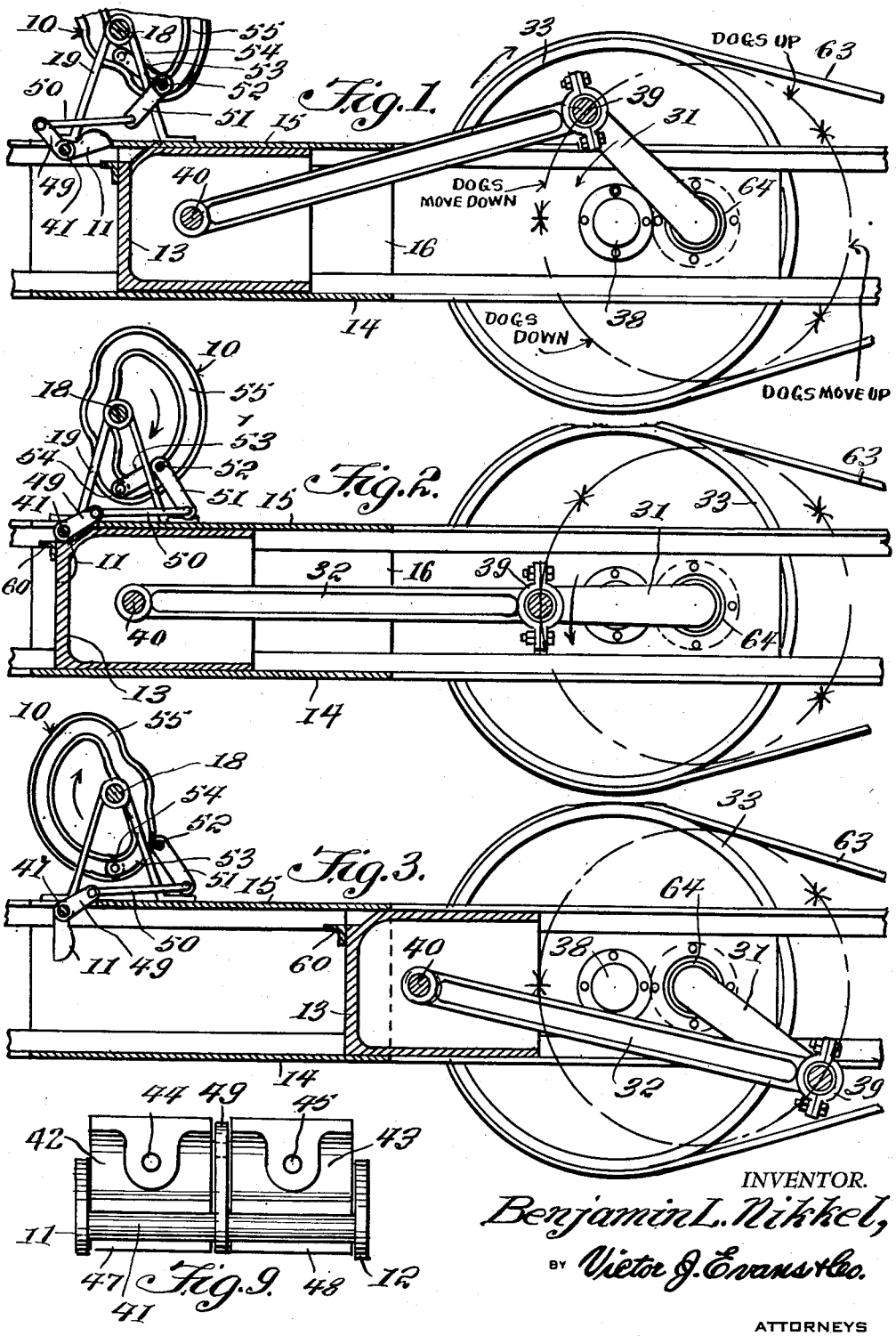
INVENTOR.
Benjamin L. Nikkel,
BY Victor J. Evans & Co.
ATTORNEYS Oct. 12, 1954  B. L. NIKKEL  2,691,340
HAY BALER CAM ACTUATED HAY RETAINING DOGS
Filed April 19, 1950  2 Sheets-Sheet 2
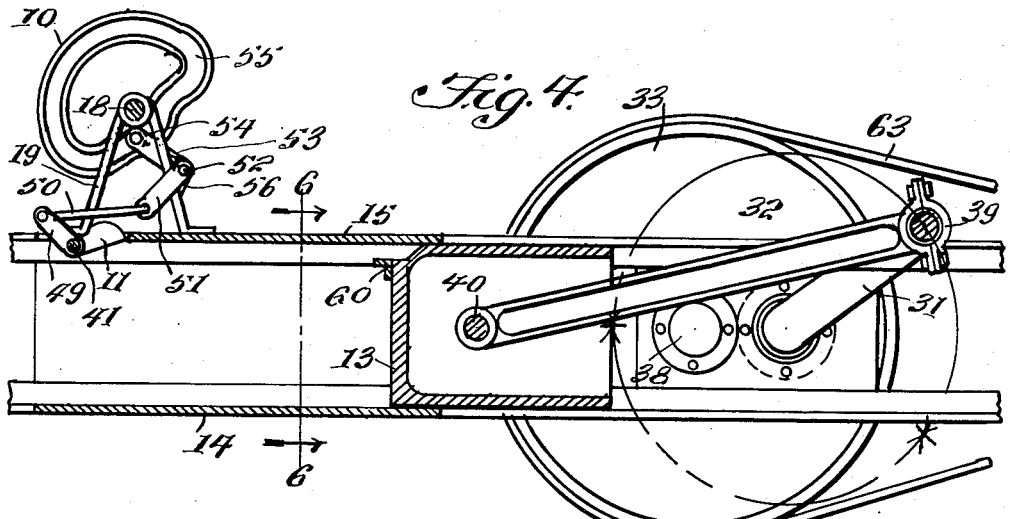
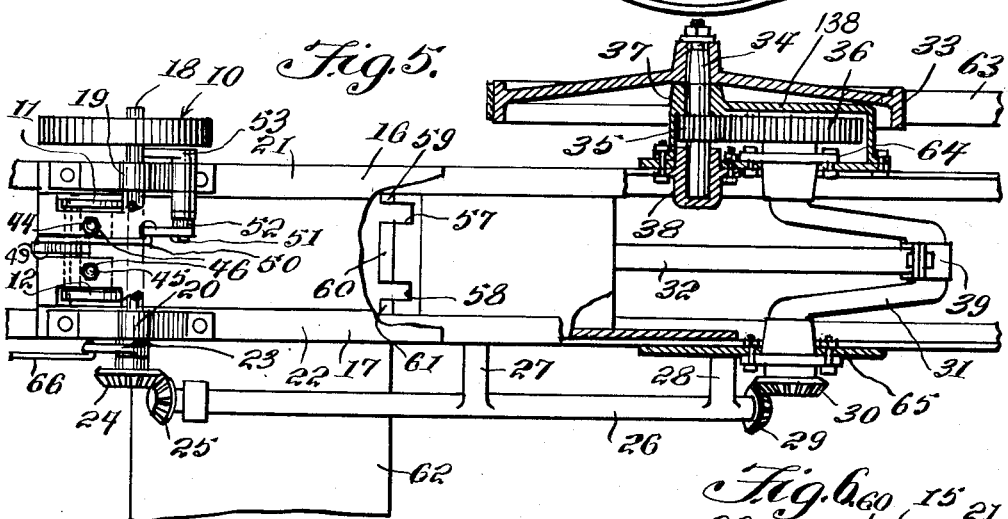
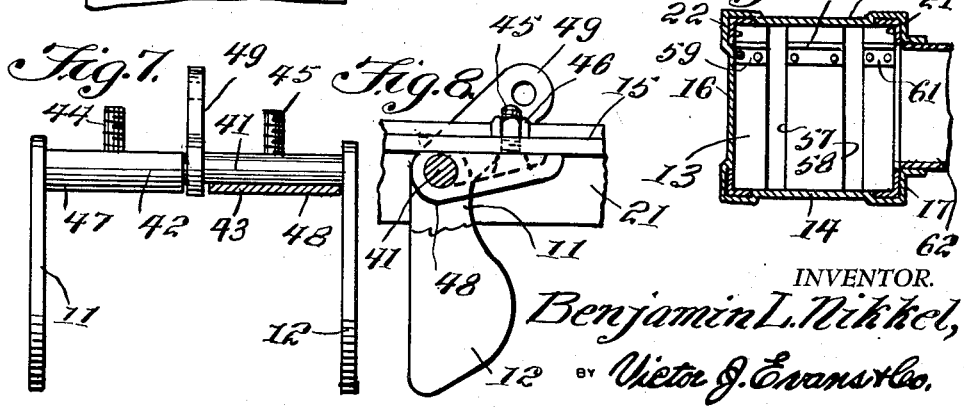
INVENTOR.
Benjamin L. Nikkel,
BY Victor J. Evans & Co.
ATTORNEYS Patented Oct. 12, 1954

2,691,340

UNITED STATES PATENT OFFICE 2,691,340

HAY BALER CAM ACTUATED HAY RETAINING DOGS

Benjamin L. Nikkel, Windom, Kans.

Application April 19, 1950, Serial No. 156,735

4 Claims. (Cl. 100—187)

1

This invention relates to devices for holding hay for tying in hay baling machines and in particular to cam actuated dogs positioned to extend through the path of hay compressed in a hay baling machine wherein the cam for actuating the dogs is driven from the eccentric or crank shaft of the baler.

The purpose of this invention is to provide means in a hay baling machine for automatically gripping and holding the hay after the hay is compressed by a plunger after the plunger is withdrawn whereby the compressed hay is retained in position for tying.

In the conventional hay baling machine the wires for tying the bale are placed through slots in the face of a plunger and as the plunger moves with a continuous action it is necessary to run the wires through the slots at the instant the plunger arrives at the end of the compression stroke. With this thought in mind this invention contemplates a pair of spaced hay retaining dogs pivotally mounted to extend into the trough of a hay baling machine wherein the dogs are actuated by a cam shaped to move the dogs into the trough as the hay baling plunger reaches the end of the stroke whereby the hay is held by the dogs as the plunger recedes.

The object of this invention is, therefore, to provide means in a hay baling machine for automatically actuating hay retaining dogs for retaining hay in a compressed position in which the movement of the dogs may be timed to correspond with the travel of the plunger.

Another object of the invention is to provide retaining means in a hay baler for holding hay in tying as the hay is released by a plunger that may be incorporated in hay balers now in use.

A further object of the invention is to provide a hay baler having cam actuated dogs therein for holding the hay compressed by a plunger as the hay is tied which is of a simple and economical construction.

With these and other objects and advantages in view the invention embodies a hay baler having an elongated rectangular shaped trough with a reciprocating plunger slidably mounted therein and actuated by a crank shaft, and a pair of dogs pivotally mounted in the upper part of the trough and positioned to be actuated by a cam whereby the dogs move downwardly into the trough for holding a bale of hay therein.

Other features and advantages of the invention will appear from the following description taken in connection with the drawings wherein:

2

Figure 1 is a longitudinal section through a hay baler with the hay retaining dogs shown in the upper or out of the way position.

Figure 2 is a similar view showing the plunger at the end of the compression stroke and also showing the dogs lowered to the hay retaining position.

Figure 3 is a similar view showing the plunger returned and the dogs in the hay gripping position.

Figure 4 is a similar view illustrating a further step in which the plunger is starting forward and the dogs are in the upper position.

Figure 5 is a plan view of the hay baler with parts broken away and parts shown in section illustrating the means for driving the shaft on which the cam that operates the dogs is positioned from the crankshaft of the baler.

Figure 6 is a cross section through the baler taken on line 6—6 of Figure 4, showing the slots in the face of the plunger through which the tying wires are extended and also through which the hay retaining dogs are actuated.

Figure 7 is an elevational view with parts broken away and shown in section illustrating the shaft by which the dogs are pivotally mounted in the baler.

Figure 8 is an end elevational view showing the shaft, dogs, and bearing for mounting the shaft in the baler.

Figure 9 is a detail illustrating the mounting of the dog carrying shaft in the upper part of the baler.

Referring now to the drawings wherein like reference characters denote corresponding parts, the improved hay baler of this machine is provided with a cam 10 for operating the dogs 11 and 12 for holding hay compressed by a plunger 13 in a trough having a base plate 14, an upper plate 15 and side plates 16 and 17.

The cam 10 is fixedly mounted on a cam shaft 18 that is journaled in bearings 19 and 20 on angles 21 and 22 at the upper corners of the trough and the cam shaft is rotated from a tractor, motor, or other driving means from a crankshaft 31 which is driven by a belt 63 from the driving means, with the crankshaft driving a cam shaft by an intermediate shaft in a tube 26, the cam shaft having a beveled gear 24 thereon that meshes with a gear 25 on the shaft extended through the elongated bearing tube 26 that is positioned on the side of the trough. Bearing tube 26 is supported by brackets 27 and 28 and the shaft therein is driven by a beveled gear 29 that meshes with a similar gear 30 on the crank or eccentric shaft 31 that actuates the plunger through a connecting rod 32. The gear 24 is operatively connected to the cam shaft 18 by a clutch 23.

The crankshaft 31 is driven by a pulley 33 on an axle 34 through gears 35 and 36, the axle 34 being journaled in bearings 37 and 38 in a gear housing 138 on the baler frame and the crankshaft 31 being connected to the connecting rod 32 by a bearing 39, the opposite end of the connecting rod being pivotally attached to the plunger through a wrist pin 40.

The dogs 11 and 12 are fixedly mounted on a jack shaft 41 and the shaft 41 is pivotally attached to the upper plate 15 by bearing elements 42 and 43 with the bearing elements secured in position by bolts 44 and 45, respectively. The bolts are provided with nuts 46. The bearing elements are provided with arcuate shoes 47 and 48, respectively which extend around the shaft. The shaft is provided with an arm 49 which is connected by a link 50 to a lever 51 of a crank or rocker shaft 52, the opposite end of which is provided with an arm 53 on which a roller 54 that extends into a groove 55 of the cam 10 is positioned. No means of adjustment is provided between the parts 49, 50, 51 and 53, as it is not necessary to change the angular relationship between these parts. The rocker shaft 52 is journaled in a bearing 56 on the side of the bearing stand 19.

The dogs 11 and 12 are positioned to register with wire tying slots 57 and 58 in the face of the plunger 13; and angles 59, 60 and 61 are positioned on the face of the plunger between the slots.

With the plunger in the position illustrated in Figure 2 the dogs 11 and 12 extend downwardly in the slots to engage the surface of the hay compressed by the plunger and in this position the faces of the dogs are in a plane corresponding with the face or end of the plunger.

A feeding chute or hopper 62 extends from the side of the trough in which the plunger is positioned as illustrated in Figures 5 and 6.

The pulley 33 of the baler as previously stated may be driven from a pulley on a tractor, or from a motor, or other suitable driving means by a belt 63 and the plunger is reciprocated by the crank shaft 31 through the gears 35 and 36. The crank shaft is journaled in bearings 64 and 65 on the sides of the trough or baler.

The groove 55 of the cam 10 is shaped whereby with the plunger approaching the forward position as illustrated in Figure 1 the dogs 11 and 12 are raised to positions above the trough and as the plunger starts back from the extreme position at the end of the stroke as shown in Figure 2 the roller 54 passes into the semi-circular section of the cam with the dogs moving downwardly to the position shown in Figures 2 and 3 with the roller held in the semi-circular section of the groove of the cam the dogs will remain in this position for substantially one half of a revolution of the shaft 10, in which movement the plunger is withdrawn to the opposite end of the stroke. At this time the roller 59 passes into the oppositely disposed interrupted arcuate portion of the groove of the cam wherein the dogs are elevated to the position shown in Figure 4 and the cam holds the dogs in this position until the plunger again approaches the dogs, as illustrated in Figure 1, from which position the cycle is repeated.

By this means the hay retaining dogs 11 and 12 move downwardly through the end of the plunger with the plunger in the extreme position or at the end of its compression stroke, and at this time the dogs are actuated downwardly through the end of the plunger to the position shown in Figures 2 and 3.

With the parts arranged in this manner hay fed to the trough of the baler is compressed by the plunger and when a predetermined amount of hay has been compressed to form a bale the clutch 23 is actuated by the trip rod 66 so that at the end of the next stroke the dogs hold the hay so that the hay may be tied as the plunger is withdrawn. After the bale is tied the next movement of the plunger drives the bale to the next position in the trough with the bale formerly occupying this position being discharged from the end of the trough.

It will be understood that modifications may be made in the design and arrangement of the parts without departing from the spirit of the invention.

What is claimed is:

1. In a hay baler having a frame, the combination which comprises an elongated trough, rectangularly shaped in cross section, a plunger slidably mounted in the trough, a crank shaft journaled on the sides of the frame, a connecting rod connecting the plunger to the crank shaft, and a jack shaft journaled in the upper part of the trough, dogs carried by the said jack shaft, a transversely disposed cam shaft journaled on the trough, a cam carried by one end of the cam shaft, said cam having a cam groove with a substantially semi-circular section and also a relatively straight section therein, a rocker shaft journaled on the trough, an arm extended from one end of the rocker shaft and having a roller thereon extending into the cam groove, means actuating the said jack shaft with the dogs thereon by the rocker shaft whereby the dogs are actuated to positions in the path of a bale of hay being compressed by the plunger in the trough, and means driving the cam shaft from the crank shaft whereby the cam actuates the jack shaft through the rocker shaft.

2. In a hay baler, the combination which comprises an elongated frame, rectangularly shaped in cross section a plunger slidably mounted in the frame, a crank shaft journaled on the sides of the frame, a connecting rod extended from the crank shaft to the plunger for actuating the plunger, said plunger having spaced slots in the face thereof, a jack shaft journaled on the frame, dogs carried by the said jack shaft and positioned to register with the slots in the face of the plunger, a cam shaft journaled on the frame and positioned above the jack shaft, a cam having a cam groove with a substantially semi-circular portion and an interrupted arcuate portion therein mounted on the cam shaft, and a rocker shaft having a lever on one end and an arm on the other for actuating the jack shaft with the dogs thereon by means of the groove of the said cam.

3. In a hay baler, the combination which comprises an elongated frame, rectangularly shaped in cross section a plunger slidably mounted in the frame, a crank shaft journaled on the sides of the frame, a connecting rod connecting the plunger to the crank shaft, said plunger having spaced slots in the face thereof, a jack shaft journaled in the upper part of the frame, dogs carried by the jack shaft and positioned to register with the slots of the plunger, said dogs being mounted to extend downwardly in the frame, a cam shaft positioned above and journaled on the said frame, a cam having a cam groove with a substantially semi-circular portion and an interrupted arcuate portion therein carried by one end of the cam shaft, a rocker shaft having an arm with a roller on the end thereof extending from one end and an arm extending from the opposite end, said rocker shaft positioned whereby the roller on the end of the arm on one end thereof extends into the cam groove, and means operatively connecting the arm extending from the opposite end of the rocker shaft to the jack shaft for operating the jack shaft and dogs carried thereby, and means adapted to rotate the cam.

4. In a hay baler, the combination which comprises an elongated frame, rectangularly shaped in cross section, a plunger slidably mounted in the frame, a crank shaft journaled on the sides of the frame, a connecting rod connecting the plunger to the crank shaft, said plunger having spaced slots in the face thereof, a jack shaft journaled in the upper part of the frame, spaced dogs carried by the jack shaft and adapted to be positioned to extend into the frame and also adapted to be positioned to extend into the slots in the face of the plunger, an arm extending from said jack shaft, bearings extending upwardly above the frame, a cam shaft journaled in the upper ends of the said bearings, a cam having a continuous cam groove in a face thereof carried by the cam shaft a rocker shaft journaled on said bearings, an arm extended from one end of said rocker shaft, a roller journaled on the end of said arm extending into the cam groove, said rocker shaft having a lever extending from the end opposite to the end from which the arm with the roller thereon extends, a link connecting the lever extending from the rocker shaft to the arm extending from the jack shaft, and means rotating the cam by the crank shaft of the baler.

References Cited in the file of this patent

UNITED STATES PATENTS

| Number | Name | Date |
|---|---|---|
| 1,333,067 | Evans | Mar. 9, 1920 |
| 1,932,917 | Taylor | Oct. 31, 1933 |
| 2,139,928 | Blewett | Dec. 13, 1938 |
| 2,237,721 | Wallace | Apr. 8, 1941 |
| 2,362,861 | Russell | Nov. 14, 1944 |
| 2,405,688 | Crumb | Aug. 13, 1946 |